(12) United States Patent
Hickford et al.

(10) Patent No.: US 8,799,923 B2
(45) Date of Patent: Aug. 5, 2014

(54) DETERMINING RELATIONSHIP DATA ASSOCIATED WITH APPLICATION PROGRAMS

(71) Applicant: International Business Machines Corporation, Armonk, NY (US)

(72) Inventors: Matthew Hickford, Abingdon (GB); Nicholas Mathias, Gerrards Cross (GB); Gavin Potter, Edinburgh (GB); Edward Warrillow, Warwickshire (GB); Matthew Whitehead, Winchester (GB); Stuart Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/090,196

(22) Filed: Nov. 26, 2013

(65) Prior Publication Data

US 2014/0082634 A1   Mar. 20, 2014

Related U.S. Application Data

(63) Continuation of application No. 12/883,327, filed on Sep. 16, 2010, now abandoned.

(30) Foreign Application Priority Data

Sep. 16, 2009   (EP) .................................... 09170459

(51) Int. Cl.
*G06F 13/00*   (2006.01)
(52) U.S. Cl.
USPC .......................................... 719/313; 719/314
(58) Field of Classification Search
USPC ................................................ 719/313, 314
See application file for complete search history.

(56) References Cited

U.S. PATENT DOCUMENTS

| | | | |
|---|---|---|---|
| 6,101,528 A | 8/2000 | Butt et al. |
| 6,286,047 B1 | 9/2001 | Ramanathan et al. |
| 7,127,507 B1 | 10/2006 | Clark et al. |
| 7,757,119 B2 | 7/2010 | Hickson |
| 7,818,426 B2 | 10/2010 | Parthasarathy et al. |
| 2004/0117801 A1 | 6/2004 | Eibach et al. |
| 2008/0077939 A1 | 3/2008 | Harran et al. |
| 2009/0070780 A1 | 3/2009 | Dinh et al. |
| 2010/0251262 A1 | 9/2010 | Rokicki et al. |
| 2011/0067036 A1 | 3/2011 | Hickford et al. |

OTHER PUBLICATIONS

F5, "AmberPoint," [Retrieved from Internet on Aug. 23, 2012], 2 pages.

(Continued)

*Primary Examiner* — Andy Ho
(74) *Attorney, Agent, or Firm* — Yee & Associates, P.C.; Yeen Tham

(57) ABSTRACT

A method for determining relationship data associated with application programs in a messaging system, comprising the steps of: responsive to at least one first message event sending a message from a first application to a first destination and at least one second message event retrieving, by a second application, the message from a second destination, intercepting message data associated with the message; analysing the intercepted message data in accordance with one or more rules in order to find one or more message parameters; and in response to finding the one or more message parameters, identifying the first message event and identifying the second message event, determining a relationship associated with the first application and the second application. An apparatus and computer program element for determining such relationship data are also provided.

20 Claims, 3 Drawing Sheets

(56) References Cited

OTHER PUBLICATIONS

Kanaracus, "Oracle Buys SOA Management Vender AmberPoint," Feb. 8, 2010, 4 pages.

Oracle, "Oracle—AmberPoint, Overview and Frequently Asked Questions," Copyright 2010, 4 pages.

Oracle, "Oracle and AmberPoint," published as early as Feb. 8, 2010, 1 page.

Krill, "AmberPoint Flex-ing SOA Management Muscles," Jun. 11, 2007, 4 pages.

Oracle, "AmberPoint—Application Discovery & Mapping, Visualization of Composite Applications and Business Transactions", Feb. 13, 2010, 4 pages.

Office Action, dated Dec. 7, 2011, regarding U.S. Appl. No. 12/883,327, 16 pages.

Final Office Action, dated May 23, 2012, regarding U.S. Appl. No. 12/883,327, 16 pages.

Notice of Allowance, dated Aug. 29, 2013, regarding U.S. Appl. No. 12/883,327, 10 pages.

DETERMINING RELATIONSHIP DATA ASSOCIATED WITH APPLICATION PROGRAMS

This Application claims the benefit of priority to U.S. patent application Ser. No. 12/883,327, filed on Sep. 16, 2010, which claims the benefit of priority to the EP Patent Application Serial No. 09170459.3, filed on Sep. 16, 2009, the contents of which are hereby incorporated by reference.

BACKGROUND

1. Field

The present invention relates to a method for determining relationship data associated with application programs in a messaging system.

2. Description of the Related Art

Software client applications are often written as and when they are required. It is not uncommon for an application to be developed with little or no supporting documentation.

Furthermore, some messaging environments (using a messaging product such as WebSphere MQ (WebSphere is a registered trademark of International Business Machines Corporation)) support asynchronous messaging resulting in a loose coupling between applications (e.g. in order to prevent an error associated with one application from holding up another application).

Although asynchronous messaging environments have advantages, understanding aspects about the environment, such as which application typically communicates with which other application(s), becomes very difficult.

There exist prior art mechanisms which insert data into a message such that the message can be tracked as it flows through the messaging infrastructure. However, this is a fairly intrusive mechanism and can have a detrimental effect on performance due to, for example, the size of the inserted data.

There also exist prior art mechanisms which modify (e.g. disable) components in the infrastructure in order to understand how applications are affected by the changes made. Once again, this is a fairly intrusive mechanism and has the added burden of requiring changes to the infrastructure which can be complex and error prone. Furthermore, this approach is difficult to implement if a business does not have a full test environment that replicates a production environment.

SUMMARY

According to a first aspect, the present invention provides a method for determining relationship data associated with application programs in a messaging system, comprising the steps of: responsive to at least one first message event sending a message from a first application to a first destination and at least one second message event retrieving, by a second application, the message from a second destination, intercepting message data associated with the message; analysing the intercepted message data in accordance with one or more rules in order to find one or more message parameters; and in response to finding the one or more message parameters, identifying the first message event and identifying the second message event, and determining a relationship associated with the first application and the second application.

According to a second aspect, the present invention provides an apparatus for determining relationship data associated with application programs in a messaging system, comprising: means, responsive to at least one first message event sending a message from a first application to a first destination and at least one second message event retrieving, by a second application, the message from a second destination, for intercepting message data associated with the message; means for analysing the intercepted message data in accordance with one or more rules in order to find one or more message parameters; and means, responsive to finding the one or more message parameters, for identifying the first message event and identifying the second message event, and for determining a relationship associated with the first application and the second application.

According to a third aspect, the present invention provides a computer program comprising program code means adapted to perform all the steps of the method above when said program is run on a computer.

BRIEF DESCRIPTION OF THE SEVERAL VIEWS OF THE DRAWINGS

The present invention will now be described, by way of example only, with reference to preferred embodiments thereof, as illustrated in the following drawings.

DETAILED DESCRIPTION

A preferred embodiment will now be described with reference to the figures.

Figure 1A:
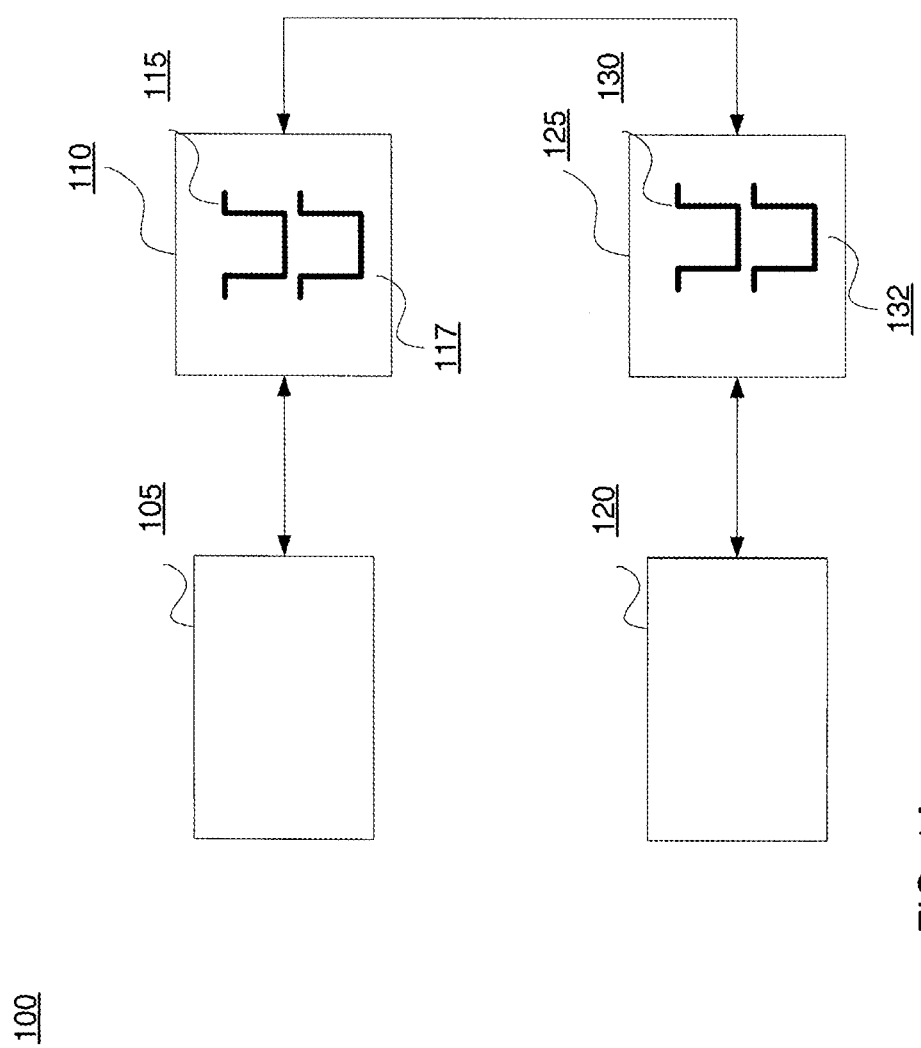
FIG. 1A is a block diagram of a prior art messaging system.

With reference to FIG. 1A, the preferred embodiment is implemented in a messaging system (100) comprising a plurality of application programs (105, 120) that intercommunicate using messages. The messages are communicated asynchronously between the application programs (105, 120) using destinations e.g. message queues (115, 130) each of which is managed by a message engine e.g., a queue manger (110, 125).

An application program can store (also known as "put") messages on a queue and retrieve (also known as "get") messages from a queue. For example, a first application (105) can put a message on a first remote queue (115). A first queue manager (110) can move the message to a first local queue (130) (typically having the same identifier as the first remote queue) such that a second application (120) can retrieve the message from the first local queue (130). Likewise, the second application (120) can put a message on a second remote queue (132). A second queue manager (125) can move the message to a second local queue (117) (typically having the same identifier as the second remote queue) such that the first application (105) can retrieve the message from the second local queue (117). Note that queues can be used in any number of ways, e.g., a message can be put to and read from the same queue.

Note that the messaging system (100) can be very complex. For example, there can be a large number of applications putting messages to and getting messages from queues. In another example, communication between applications can be non-deterministic in that there can be several applications which retrieve messages from the same endpoint queue and it is difficult to determine which particular application will retrieve a message. In yet another example, a workload balancer may be used to distribute messages from an original queue to one or more instances of further queues based on a workload balancing mechanism. The scenarios in any of the above examples result in the determination of relationships between applications being more difficult.

Figure 1B:
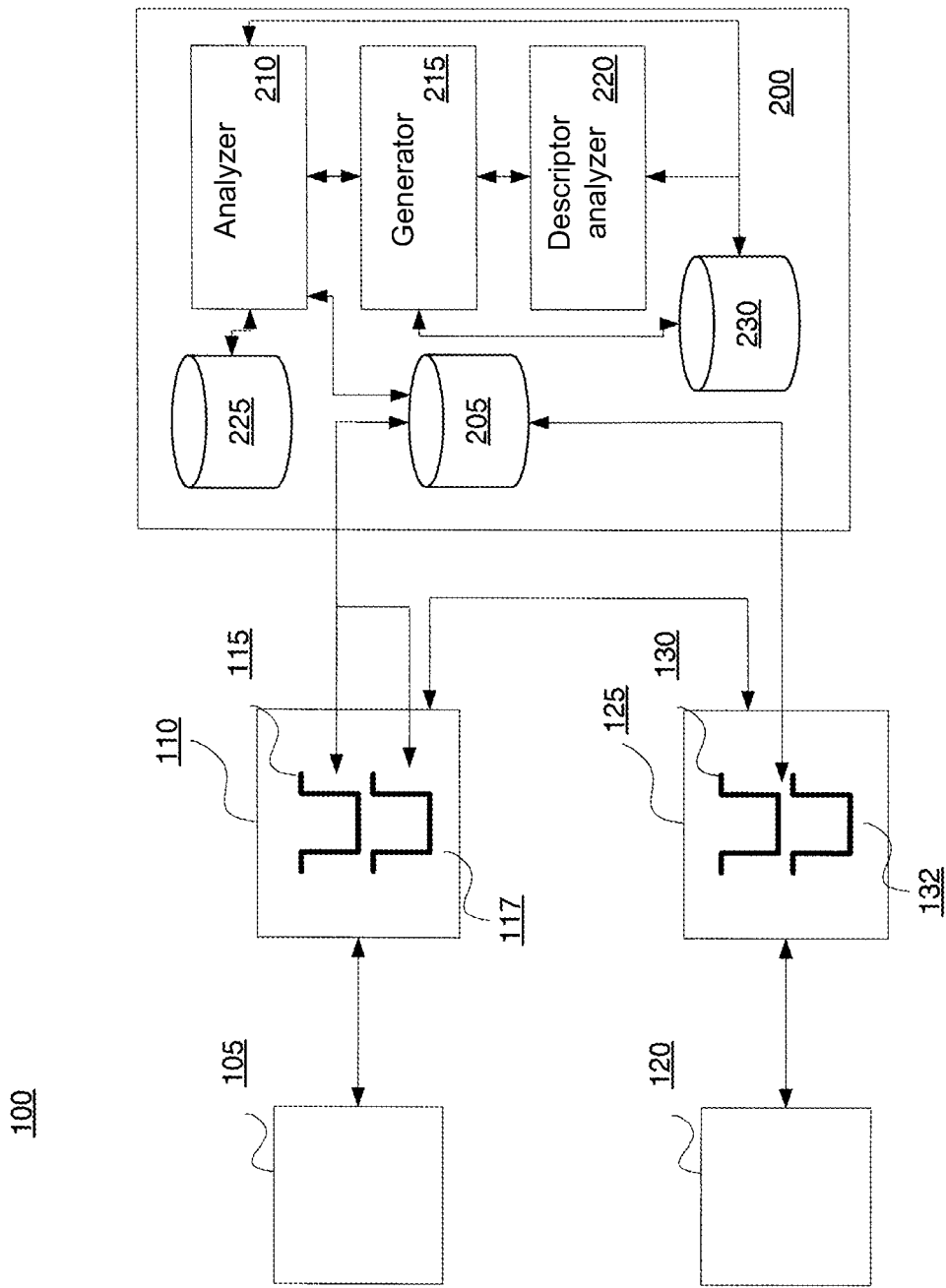
FIG. 1B is a block diagram of an apparatus of the preferred embodiment in use with a prior art messaging system.

An apparatus (200) of the preferred embodiment is depicted in FIG. 1B and comprises a database (205). Preferably, a program, termed herein an "exit" is associated with each queue manager (110, 125) in the system (100), whereby the exit is operable to record data associated with each message that is put to or got from associated queues (115, 117, 130, 132) (e.g., when an application releases control of a message). Note that interception of message data at a destination is advantageous since the application programs typically do not communicate directly with each other.

Data associated with each message "event" (e.g. wherein a first event comprises a put operation and a second event comprises a get operation) is operable to be stored in the database (205) by the exit.

The apparatus (200) also comprises an analyzer (210) operable to access one or more rules (225); a generator (215) operable to generate one or more descriptors; and a descriptor analyzer (220). The analyzer (210), the generator (215) and the descriptor analyzer (220) are operable to access a storage component (230).

Figure 2:
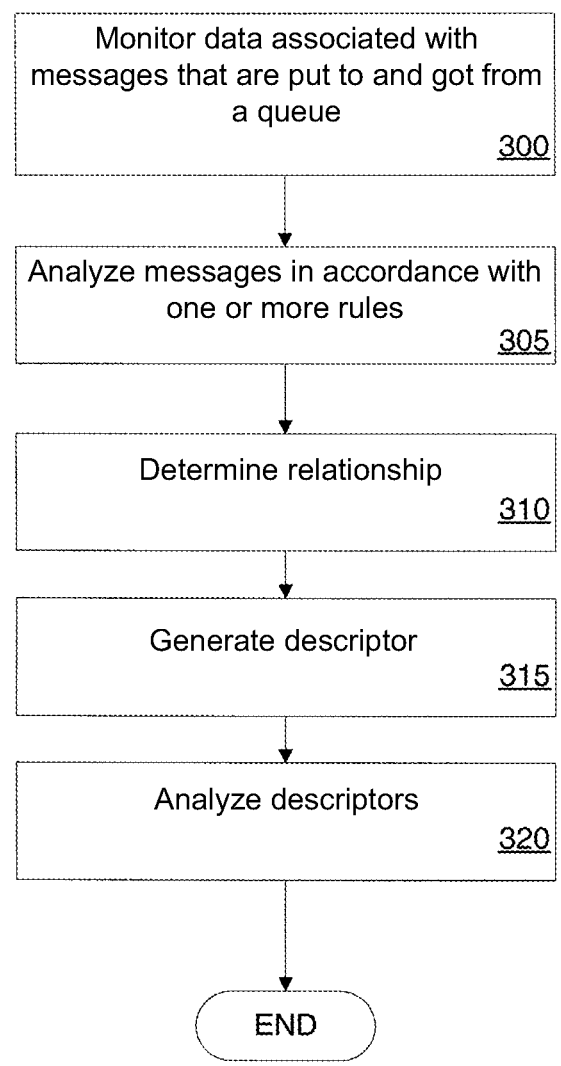
FIG. 2 is a flow chart showing the operational steps involved in a process of the preferred embodiment.

The preferred embodiment will now be described with reference to a flow chart showing the operational steps involve in a process according to the preferred embodiment is shown in FIG. 2.

In an example, the first application (105) puts a first message on the first remote queue (115)—this event is detected (step 300) by a first exit associated with a first queue manager (110) (e.g. by monitoring a put operation identifier (e.g., "MQPUT")).

The first exit identifies the putting application using e.g. an application name identifier and/or a process identifier, and logs data associated with the identified application in the database (205) against an entry associated with put message data. A representation of the application data is shown below:

Application data=App_1.exe

Further, the first exit scans (preferably, read-only) the first message, unobtrusively reading e.g. header data (such as a message identifier; timestamp; message type; associated queue identifier etc.) and logs the message data in the database (205) against the entry associated with put message data. A representation of the message data is shown below:

Message data=MSG_ID=Msg001; Content="add database row abc to warehouse"; Queue_name=QA In the example, a first queue manager (110) e.g., moves the first message to the first local queue (130) and the second application (120) gets the first message from the first local queue (130)—this event is detected (step 300) by a second exit associated with a second queue manager (125) (e.g. by monitoring a get operation identifier).

The second exit identifies the getting application and logs data associated with the identified application in the database (205) against an entry associated with get message data. A representation of the application data is shown below:

Application data=App_2.exe

Further, the second exit scans the first message and logs the message data in the database (205) against the entry associated with get message data. A representation of the message data is shown below:

Message data=MSG_ID=Msg001; Content="add database row abc to warehouse"; Queue_name=QA In the example, the second application (120) processes the first message and puts a second message, in response to the first message, on the second remote queue (132)—this event is detected (step 300) by the second exit associated with the second queue manager (125).

The second exit identifies the putting application and logs data associated with the identified application in the database (205) against an entry associated with put message data. A representation of the application data is shown below:

Application data=App_2.exe

Further, the second exit scans the second message and logs the message data in the database (205) against the entry associated with put message data. A representation of the message data is shown below:

Message data=CorrelID=Msg001; Content="successfully added database row abc to warehouse"; Queue_name=QB In the example, the second queue manager (125) e.g., moves the second message to the second local queue (117) and the first application (105) gets the first message from second local queue (117)—this event is detected (step 300) by the first exit associated with the first queue manager (110).

The first exit identifies the getting application and logs data associated with the identified application in the database (205) against an entry associated with get message data. A representation of the application data is shown below:

Application data=App_1.exe

Further, the second exit scans the second message and logs the message data in the database (205) against the entry associated with get message data. A representation of the message data is shown below:

Message data=CorrelID=Msg001; Content="successfully added database row abc to warehouse"; Queue_name=QB Preferably, the monitoring step is repeated for each put and get operation. Alternatively, the monitoring step can be repeated for each put and get operation within e.g. a pre-configurable time period.

In the example herein, following the monitoring step, representations of the application data and message data stored in the database (205) are shown below:

Put Message Data:

Application data=App_1.exe; Message data=MSG_ID=Msg001; Content="add database row abc to warehouse"; Queue_name=QA Application data=App_2.exe; Message data=CorrelID=Msg001; Content="successfully added database row abc to warehouse"; Queue_name=QB Application data=myapp.exe; Message data=Timestamp=007653; Content="Error123"

Application data=help.exe; Message data=MSG_ID=Msg_abc; Timestamp=007655;

Application data=Service_sss.exe; Message data=Replyto=Queue1; Timestamp=000001

Get Message Data:

Application data=App_2.exe; Message data=MSG_ID=Msg001; Content="add database row abc to warehouse"; Queue_name=QA Application data=App_1.exe; Message data=CorrelID=Msg001; Content="successfully added database row abc to warehouse"; Queue_name=QB Note that the put message data and the get message data can reside on the same database. Alternatively, the put message data and the get message data can reside on separate databases.

At step 305, the analyzer (210) accesses the data stored in the database (200) and analyzes the data in accordance with one or more rules (225) in order to determine whether, for a particular entry in the put message data, there is an associated entry in the get message data.

Note that this aim is atypical in asynchronous messaging environments wherein a putting application does not have knowledge of a getting application and vice versa.

Examples rules are detailed below:

Rule 1—the analyzer (210) searches the put message data and the get message data for matching message identifiers. If matching entries are found, the analyzer (210) is configurable to identify that the application associated with the put message entry sends data to the application associated with the get message entry (i.e. the putting application has a send-receive relationship with the getting application).

It should be noted that in messaging environments, typically, any number of messages may share the same identifier. Thus, preferably, the analyzer (210) e.g., compares a hashed computation of one or more message properties of a first message entry with a hashed computation of one or more message properties of a second message entry in order to increase confidence in any result.

Rule 2—if a putting application has an associated report option specifying that a message identifier associated with a request message should equal a correlation identifier in any response message that is put, the analyzer (210) is able to detect the option and subsequently search the put message data for a message identifier which equals a correlation identifier respectively. If matching entries are found, the analyzer (210) is configurable to identify that the applications associated with the put message entries have a request-response relationship.

Rule 3—the analyzer (210) searches the put message data for a header parameter e.g. "reply to". Note that the "reply to" parameter typically comprises a value associated with a queue to which a response message to an original request message should be put. Preferably, if the analyzer (210) finds a "reply to" parameter in put message data, it reads the associated value and in response, searches the get message data for the value. Subsequently, the analyzer (210) can e.g., search any matching get message data for e.g. a message identifier that matches an identifier in the put message data. If matching entries are found, the analyzer (210) is configurable to identify that the associated applications have a request-response relationship.

Rule 4—timestamps can be analyzed, such that if an entry in the put message data comprises the same timestamp as an entry in the get message data, the analyzer is operable to determine that the put entry is associated with the get entry (because typically, a timestamp is added when a message is first put to a queue). Preferably, timestamps are analyzed over time such that patterns can be detected e.g., wherein a first application puts a message (that has a first timestamp value) that is retrieved by a second application and the second application puts a message (that has a second timestamp value) that is retrieved by a first application—monitoring may determine that the difference between the first and second timestamp value typically comprises a third value—in this case, the analyzer is operable to identify that the first and second applications have a request-response relationship.

Note that the analyzer (210) can use a plurality of the rules to determine a result such that e.g. if a larger number of rules are used, confidence relatively increases in any result determined by the analyzer (210).

Note also that the rules can be weighted such that the analyzer can use e.g. a combination of higher weighted rules in order to increase confidence in any result. For example, a rule associated with analysis of a timestamp only has a lower weight than a rule associated with analysis of a message identifier only (as, for example, a timestamp is typically less unique than a message identifier over a relatively short monitoring time period (e.g. a few days)).

In the example herein, the analyzer (210) accesses the data stored in the database (200) and analyzes the data in accordance with one or more rules (e.g., in sequential order).

In the example herein, the analyzer (210) analyzes the put message data and the get message data in accordance with Rule 1. Subsequently, the analyzer (210) determines that there are two entries having the same message identifier, namely:

Application data=App_1.exe; Message data=MSG_ID=Msg001; Content="add database row abc to warehouse"; Queue_name=QA Application data=App_2.exe; Message data=MSG_ID=Msg001; Content="add database row abc to warehouse"; Queue_name=QA At step 310, the analyzer (210) uses the result in order to determine a relationship which it stores in a storage component (230). In response to finding entries in the put message data and the get message data having matching message identifiers, the analyzer (210) is operable to determine a relationship wherein the putting application sends a message to the getting application (i.e., a send-receive relationship). Preferably, in order to represent the relationship, the analyzer parses the message data and extracts e.g., application identifiers and further, preferably, destination identifiers in accordance with pre-configurable templates (e.g., associated with a send-receive relationship—wherein the template comprises the following (the content in square brackets denotes values): "[putting application identifier] has a send-receive relationship with [getting application identifier] using destination [destination identifier]"), a request-response relationship etc.). A representation of the relationship is shown below:

App_1.exe has a send-receive relationship with App_2.exe using destination QA

In the example herein, the analyzer (210) analyzes the put message data in accordance with Rule 2. Subsequently, the analyzer determines that there is a pair of entries wherein a message identifier equals a correlation identifier, namely:

Application data=App_1.exe; Message data=MSG_ID=Msg001; Content="add database row abc to warehouse"; Queue_name=QA Application data=App_2.exe; Message data=CorrelID=Msg001; Content="successfully added database row abc to warehouse"; Queue_name=QB At step 310, the analyzer (210) uses the result in order to determine a relationship which it stores in the storage component (230). In response to finding entries in the put message data having a matching message identifier and correlation identifier, the analyzer (210) is operable to determine a relationship wherein the putting applications have a request-response relationship. A representation of the relationship is shown below:

App_1.exe has a request-response relationship with App_2.exe using destination QA and destination QB respectively In the example herein, the analyzer (210) analyzes the put message data and the get message in accordance with Rule 3 and does not find any matching entries.

In the example herein, the analyzer (210) analyzes the put message data and the get message in accordance with Rule 4 and does not find any matching entries.

Note that the results obtained by the analyzer (210) can be verified by e.g. a human operator in order to filter the results such that confidence in the results can be increased.

Note that in a preferred implementation, the analyzer determines relationships in e.g., a format that is proprietary to the messaging system (100).

At step 315, the generator (215) uses a stored relationship generated by the analyzer (210) in order to generate a descriptor which it stores in the storage component (230). Preferably, the generator (215) uses a language such as WSDL (Web Services Definition Language) to generate a machine-readable descriptor (e.g., that is not proprietary to the messaging system (100)). The generation of a descriptor allows for output from the analysis stage to be re-used e.g., by a web service; by further analysis tools—this is advantageous in customer environments e.g., to promote service/application reuse.

In the example herein, the generator (215) parses the first relationship, namely "App__1.exe has a send-receive relationship with App__2.exe using destination QA" in order to generate a descriptor by, for example, parsing the relationship in order to determine application identifiers and destination identifiers and placing the identifiers in an output (e.g. WSDL) file according to pre-configurable templates (e.g., associated with a send-receive relationship, a request-response relationship etc.). A representation of the descriptor is shown below:

<operation name=App__1.exe sends_to QA which_ is_used_by App__2.exe>

In the example herein, the generator (215) parses the second relationship, namely "App__1.exe has a request-response relationship with App__2.exe using destination QA and destination QB respectively" in order to generate the following descriptor:

<operation name=App__1.exe sends_to QA which_ is_used_by App__2.exe which_sends_to QB which_ is_used_by App__1.exe>

At step 320, the descriptor analyzer (220) (e.g. a repository tool such as IBM's WSRR (WebSphere Service Registry and Repository product) which is operable to support descriptor output files) is operable to access and read one ore more stored descriptors in order to e.g., generate relationships associated with multiple descriptors e.g., the descriptor analyzer (220) searches the descriptors for a first application identifier in order to determine how many other applications the first application communicates with—the result can be used in e.g., impact analysis in order to determine the effect of failure or controlled shutdown of the first application; generate a visual output of a relationship—e.g., rendering graphical connectors components between visual components representing applications and destinations.

Advantageously, the preferred embodiment allows for (retrospective) discovery and cataloguing of existing applications in order to e.g., discover relationships between applications.

The preferred embodiment allows for data associated with the determined relationships to be stored, promoting re-use of the data.

Advantageously, the preferred embodiment is non-intrusive and does not require resource-intensive and complex changes to the messaging infrastructure.

It should be noted that e.g., the representation of the rules, relationships and descriptors are exemplary.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical; or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, causes said computer system to perform all the steps of the described method.

It will be clear to one skilled in the art that many improvements and modifications can be made to the foregoing exemplary embodiment without departing from the scope of the present invention.

What is claimed is:

1. A method performed by a data processing system for determining relationship data associated with application programs in a messaging system, comprising steps of:

responsive to a first message event sending a message from a first application to a first destination, the data processing system intercepting first message data associated with the message;

responsive to a second message event retrieving, by a second application, the message from a second destination, the data processing system intercepting second message data associated with the message;

the data processing system analyzing the intercepted first message data and the intercepted second message data in accordance with at least one rule in order to find at least one message parameter that is common to both the intercepted first message data and the intercepted second message data; and in response to finding the at least one message parameter, the data processing system determining a relationship associated with the first application and the second application.

2. A method as claimed in claim 1, further comprising the step of:

using the determined relationship in order to generate a descriptor that describes the determined relationship in accordance with a pre-configurable template, wherein the descriptor identifies the first application, the second application, the first destination and the second destination.

3. A method as claimed in claim 2, wherein the descriptor is generated using WSDL.

4. A method as claimed in claim 2, further comprising a step of:

using the generated descriptor for at least one of: further relationship analysis associated with the first application and the second application; impact analysis and visualization of the relationship.

5. A method as claimed in claim 1, wherein the at least one message parameter comprises a message identifier and a destination identifier.

6. A method as claimed in claim 1, wherein the first destination comprises messages received from at least one other application that is different from the first application and the second application.

7. A method as claimed in claim 1, wherein data associated with the first application, the second application, the intercepted first message data and the intercepted second message data are logged in a storage component.

8. A method as in claim 7, wherein the analyzing step comprises determining whether, for a particular entry in put message data, there is an associated entry in get message data.

9. A method as claimed in claim 1, wherein the messaging system comprises an asynchronous messaging system where the first application sends messages to the first destination, and a queue manager moves the messages sent by the first application and other messages sent by another sending application that is different from the first application and the second application to the second destination for retrieval by the second application and another retrieving application that is different from the first application, the second application and the another sending application.

10. A method as claimed in claim 1, wherein the first destination is a first queue, the second destination is a second queue, and the first queue and the second queue are located within a same storage component.

11. A method as in claim 1, wherein the at least one rule is a plurality of rules, and wherein a first rule of the plurality of rules is used to analyze the intercepted message data to find the at least one message parameter, and then a second rule of the plurality of rules that is different from the first rule is used to analyze the intercepted message data to find the at least one message parameter.

12. A method as claimed in claim 11, wherein the first destination comprises messages received from at least one other application that is different from the first application and the second application.

13. A method as claimed in claim 1, wherein the at least one rule includes a first rule whereby the intercepted message is analyzed by searching put message data and get message data for matching message identifiers.

14. A method as in claim 13, wherein the relationship associated with the first application and the second application is a send-receive relationship between a putting application and a getting application.

15. A method as in claim 13, wherein the at least one rule includes a second rule whereby the intercepted message is analyzed by searching the put message data for a message identifier which equals a correlation identifier.

16. A method as in claim 15, wherein the relationship associated with the first application and the second application is a request-response relationship between the first application and the second application.

17. A method as in claim 13, wherein the at least one rule includes a third rule whereby the intercepted message is analyzed by searching the put message data for a header parameter.

18. A method as in claim 13, wherein the at least one rule includes a fourth rule whereby the intercepted message is analyzed by searching the put message data and the get message data for timestamps.

19. An apparatus for determining relationship data associated with application programs in a messaging system, comprising:

a central processor unit (CPU), a computer readable memory and a computer readable storage media;

first program instructions, responsive to a first message event sending a message from a first application to a first destination, to intercept first message data associated with the message;

second program instructions, responsive to a second message event retrieving, by a second application, the message from a second destination, to intercept second message data associated with the message;

third program instructions to analyze the intercepted first message data and the intercepted second message data in accordance with at least one rule in order to find at least one message parameter that is common to both the intercepted first message data and the intercepted second message data; and fourth program instructions, responsive to finding the at least one message parameter, to determine a relationship associated with the first application and the second application; and wherein the first, second, third and fourth program instructions are stored on the computer readable storage media for execution by the CPU via the computer readable memory.

20. A computer program product comprising a tangible non-transitory computer usable storage medium having program code stored thereon that is operable when executed by a data processing system to perform steps of:

responsive to a first message event sending a message from a first application to a first destination intercepting first message data associated with the message;

responsive to a second message event retrieving, by a second application, the message from a second destination, the data processing system intercepting second message data associated with the message;

analyzing the intercepted first message data and the intercepted second message data in accordance with at least one rule in order to find at least one message parameter that is common to both the intercepted first message data and the intercepted second message data; and responsive to finding the at least one message parameter, determining a relationship associated with the first application and the second application.

* * * * *